US010997745B2

(12) United States Patent
Liu et al.

(10) Patent No.: US 10,997,745 B2
(45) Date of Patent: May 4, 2021

(54) AUGMENTED REALITY BASED METHOD AND APPARATUS FOR SPATIAL POSITIONING

(71) Applicant: HUAQIN TECHNOLOGY CO., LTD., Shanghai (CN)

(72) Inventors: Pingping Liu, Shanghai (CN); Yuantong Zhang, Shanghai (CN); Zhenghua Wei, Shanghai (CN)

(73) Assignee: HUAQIN TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/713,540

(22) Filed: Dec. 13, 2019

(65) Prior Publication Data
US 2020/0118290 A1 Apr. 16, 2020

Related U.S. Application Data

(63) Continuation of application No. PCT/CN2017/114840, filed on Dec. 6, 2017.

(30) Foreign Application Priority Data

Jun. 16, 2017 (CN) .......................... 201710455706.0

(51) Int. Cl.
G06T 7/73 (2017.01)
G06T 15/10 (2011.01)
G06T 19/00 (2011.01)

(52) U.S. Cl.
CPC ................ G06T 7/73 (2017.01); G06T 15/10 (2013.01); G06T 19/006 (2013.01); G06T 2215/16 (2013.01)

(58) Field of Classification Search
None
See application file for complete search history.

(56) References Cited

U.S. PATENT DOCUMENTS 7,884,823 B2 * 2/2011 Bertolami ............... A63F 13/10
345/427
10,462,406 B2 10/2019 Igarashi et al.
(Continued)

FOREIGN PATENT DOCUMENTS

CN 101785026 A 7/2010
CN 102411854 A 4/2012
(Continued)

OTHER PUBLICATIONS

Written Opinion of the International Searching Authority in corresponding International Patent Application No. PCT/CN2017/114840, dated Feb. 26, 2018.
(Continued)

Primary Examiner — Jwalant Amin
(74) Attorney, Agent, or Firm — Ladas & Parry LLP

(57) ABSTRACT

Embodiments of the present disclosure relate to the field of spatial positioning, and disclose a method and apparatus for spatial positioning based on augmented reality. In the embodiments of the present disclosure, the augmented reality based method for spatial positioning including: acquiring an offset angle of a dual-camera coordinate system relative to a world coordinate system, wherein the world coordinate system is a coordinate system that is preset by using a known target position of a positioning photosphere as a reference coordinate; acquiring an actual position of the positioning photosphere in the world coordinate system; calculating a coordinate value of the dual camera in the world coordinate system in accordance with the offset angle, the actual position of the positioning photosphere, and the target position; and determining a position of a virtual object in a virtual space in the world coordinate system in accordance with the coordinate value of the dual camera in the world coordinate system. Embodiments of the present disclosure (Continued)

further disclose the apparatus for spatial positioning based on augmented reality.

9 Claims, 11 Drawing Sheets

(56) References Cited

U.S. PATENT DOCUMENTS

| | | | | |
|---|---|---|---|---|
| 2002/0113756 | A1* | 8/2002 | Tuceryan | H04N 13/376 345/8 |
| 2005/0151963 | A1* | 7/2005 | Pulla | G01B 21/02 356/139.03 |
| 2009/0128552 | A1 | 5/2009 | Fujikli et al. | |
| 2017/0047051 | A1 | 2/2017 | Deering | |
| 2017/0316612 | A1* | 11/2017 | Moteki | G06T 7/73 |
| 2019/0149807 | A1* | 5/2019 | Akao | H04N 7/157 348/54 |
| 2019/0253611 | A1* | 8/2019 | Wang | H04N 5/23216 |

FOREIGN PATENT DOCUMENTS

| | | |
|---|---|---|
| CN | 104090660 A | 10/2014 |
| CN | 106326930 A | 1/2017 |
| CN | 106663338 A | 5/2017 |
| CN | 106791784 A | 5/2017 |
| CN | 106814851 A | 6/2017 |
| CN | 107392961 A | 11/2017 |

OTHER PUBLICATIONS

International Search Report of in corresponding International Patent application No. PCT/CN2017/114840, dated Feb. 9, 2018.

Pustka, D. et al., "Optical Outside-In Tracking using Unmodified Mobile Phones," IEEE International Symposium on Mixed and Augmented Reality 2012 Science and Technology Proceedings, Nov. 8, 2012.

* cited by examiner

AUGMENTED REALITY BASED METHOD AND APPARATUS FOR SPATIAL POSITIONING

CROSS REFERENCE TO RELATED APPLICATIONS

This application is a continuation of Application No.: PCT/CN2017/114840 filed Dec. 6, 2017 the entire contents of which are incorporated herein by reference. The present disclosure is based on a Chinese patent application No. 2017104557060, filed on Jun. 16, 2017, and claims a priority of the Chinese patent application, the entire contents of which are hereby incorporated by reference.

TECHNICAL FIELD

The present patent disclosure relates to the field of spatial positioning, in particular to a method and apparatus for spatial positioning based on augmented reality.

BACKGROUND

AR (Augmented Reality) is a technology that calculates the position and angle of a camera image in real time and adds corresponding images, videos and 3D models. A purpose of this technology is to put the virtual world into the real world in a screen and interact with it. With the improvement of CPU (Central Processing Unit) computing power of a portable electronic product, it is expected that augmented reality will be used more and more widely.

An AR head-mounted device used by users in the existing technologies usually adopts the Inside-Out scheme to locate a virtual object. However, when the Inside-Out positioning scheme is applied in an AR scene, the positioning of the virtual object and a real object needs to be achieved by a dual camera device and a positioning photosphere.

However, the inventor of the present disclosure found that at least the following technical defects still exist in the existing technologies: when the dual camera device is displaced or rotated relative to the positioning photosphere, an object in the virtual scene cannot coincide with the position of the positioning photosphere, thus causing the object in the virtual scene cannot be tightly combined with the object in a real scene.

SUMMARY

An object of some embodiments of the present disclosure is to provide a method and apparatus for spatial positioning based on augmented reality, which may ensure that the virtual object in the virtual scene may coincide with the position of the positioning photosphere, avoiding the phenomenon that the virtual object may not be tightly combined with the real object in the real scene because the virtual object may not coincide with the position of the positioning photosphere, thus the close combination of the virtual object and the real object in the virtual scene may be ensured, which facilitates to match the users' needs.

In the first aspect, embodiments of the present disclosure provides a method for spatial positioning based on augmented reality, which including: acquiring an offset angle of a dual-camera coordinate system relative to a world coordinate system, wherein the world coordinate system is a coordinate system that is preset by using a known target position of a positioning photosphere as a reference coordinate; acquiring an actual position of the positioning photosphere in the world coordinate system; calculating a coordinate value of the dual camera in the world coordinate system in accordance with the offset angle, the actual position of the positioning photosphere, and the target position; and determining a position of a virtual object in a virtual space in the world coordinate system in accordance with the coordinate value of the dual camera in the world coordinate system.

In the third aspect, embodiments of the present disclosure further provides an electronic device, which including: at least one processor, and, a memory communicatively connected to the at least one processor, wherein the memory stores instructions which, when executed by the at least one processor, cause the at least one processor to: acquire an offset angle of a dual-camera coordinate system relative to a world coordinate system, wherein the world coordinate system is a coordinate system that is preset by using a known target position of a positioning photosphere as a reference coordinate; acquire an actual position of the positioning photosphere in the world coordinate system; calculate a coordinate value of the dual camera in the world coordinate system in accordance with the offset angle, the actual position of the positioning photosphere and the target position; and determine a position of a virtual object in a virtual space in the world coordinate system in accordance with the coordinate value of the dual camera in the world coordinate system.

In the fourth aspect, embodiments of the present disclosure further provides a non-transitory computer-readable storage medium having machine-readable instructions that, when executed by at least one processor, cause the at least one processor to: acquire an offset angle of a dual-camera coordinate system relative to a world coordinate system, wherein the world coordinate system is a coordinate system that is preset by using a known target position of a positioning photosphere as a reference coordinate; acquire an actual position of the positioning photosphere in the world coordinate system; calculate a coordinate value of the dual camera in the world coordinate system in accordance with the offset angle, the actual position of the positioning photosphere and the target position; and determine a position of a virtual object in a virtual space in the world coordinate system in accordance with the coordinate value of the dual camera in the world coordinate system.

Compared with the existing technologies, embodiments of the present disclosure, through acquiring an offset angle of a dual-camera coordinate system relative to a world coordinate system; acquiring an actual position of the positioning photosphere in the world coordinate system; calculating a coordinate value of the dual camera in the world coordinate system in accordance with the offset angle, the actual position of the positioning photosphere, and the target position; and determining a position of a virtual object in a virtual space in the world coordinate system in accordance with the coordinate value of the dual camera in the world coordinate system, may ensure that the virtual object in the virtual scene may coincide with the position of the positioning photosphere, avoiding the phenomenon that the virtual object may not be tightly combined with the real object in the real scene because the virtual object may not coincide with the position of the positioning photosphere, thus the close combination of the virtual object and the real object in the virtual scene may be ensured, which facilitates to match the users' needs.

In one embodiment of the present disclosure, the step of calculating of a coordinate value of the dual camera in the world coordinate system in accordance with the offset angle, the actual position of the positioning photosphere and the target position includes: establishing a geometric positional relationship in accordance with the offset angle, the actual position of the positioning photosphere and the target position; establishing a mathematical equation set in accordance with the geometric positional relationship, wherein a coordinate value of the dual camera on each coordinate axis of the world coordinate system is an unknown variable of the mathematical equation set; and solving the mathematical equation set to acquire the coordinate value of the dual camera on each coordinate axis of the world coordinate system. One specific implementation method for calculating the coordinate value of the dual camera in the world coordinate system is provided by this way, which facilitates to ensure further feasibility of the present disclosure.

In one embodiment of the present disclosure, the step of establishing the geometric positional relationship in accordance with the offset angle, the actual position of the positioning photosphere and the target position, including: making a projection point B of a target position S on a plane XY of the world coordinate system, making a point A, wherein a line passing through the point A and an actual position $C_1$ of the positioning photosphere is parallel to a Y-axis of a dual-camera coordinate system and the point A is separated from the $C_1$ by a length Y1, making an intersection point N of the $C_1A$ and the plane XY of the world coordinate system, wherein the actual position $C_1$ of the positioning photosphere is the offset coordinate (X1, Y1, Z1) in the world coordinate system relative to the target position S; making an intersection point P of the Y-axis in the dual-camera coordinate system and the plane XY of the world coordinate system; making a perpendicular of the plane XY of the world coordinate system through the position C of the dual camera to have an intersection point H with the plane XY of the world coordinate system; making an intersection point T by intersecting a line that passes through the S and is parallel to a line NB with a line $C_1N$, wherein a line ST intersects with a preset plane at an intersection point E, and the preset plane is a plane that passes through a line CH and is parallel to a plane YZ of the world coordinate system; and making the projection G of the S on the preset plane, making the perpendicular of the CH to pass through the $C_1$, and to intersect with the CH at J, making the plane XY of the world coordinate system through the S to intersect with the line CH at $C_2$, making the perpendicular of the line SE to pass through the $C_2$ and to intersect with the line SE at F. One specific implementation method for establishing the geometric positional relationship is provided by this way, which facilitates to ensure further feasibility of the present disclosure.

In one embodiment of the present disclosure, the step of establishing a mathematical equation set in accordance with the geometric positional relationship includes: formulating a first equation set in accordance with the geometric figure projection of the geometric positional relationship in the positive direction of the Z-axis of the dual-camera coordinate system: $QB=Y0*\sin \gamma+X1$; $NA=(Y0*\sin \gamma+X1)*\tan \gamma+Y0*\cos \gamma$, wherein Y0 is a reference coordinate value of the positioning photosphere, and an angle $\gamma$ is a rotation angle of the dual-camera coordinate system around the Z-axis relative to the world coordinate system; formulating a second equation set in accordance with the geometric figure projection of the geometric positional relationship in the negative direction of the X-axis of the dual-camera coordinate system: $N\ C_1=(Y0*\cos \gamma+(X1+Y0*\sin \gamma)*\tan \gamma)/\cos \alpha+Y1$; $CP=Z1*\tan \alpha+(Y0*\cos \gamma+(X1+Y0*\sin \gamma)*\tan \gamma)/\cos \alpha+Y1$; wherein the $\alpha$ is a rotation angle of the dual-camera coordinate system around the X-axis relative to the world coordinate system; formulating a third equation set in accordance with the geometric figure projection of the geometric positional relationship in the negative direction of the Z-axis of the world coordinate system: $CH=(Z1*\tan \alpha+(Y0*\cos \gamma+(X1+Y0*\sin \gamma)*\tan \gamma)/\cos \alpha+Y1)*\cos \gamma$; solving a coordinate value CH of the dual camera on the Y-axis of the world coordinate system in accordance with the first equation set, the second equation set and the third equation set, when solving the mathematical equation set to acquire coordinate values of the dual camera on each coordinate axis of the world coordinate system; formulating a fourth equation set in accordance with the geometric figure projection of the geometric positional relationship in the positive direction of the Z-axis of the dual-camera coordinate system: $AT=X1*\tan \gamma$; $TF=(Y1+X1*\tan \gamma)*\sin \gamma$; $SF=X1/\cos \gamma-(Y1+X1*\tan \gamma)*\sin \gamma$; formulating a fifth equation set in accordance with the geometric figure projection of the geometric positional relationship in the negative direction of the X-axis of the world coordinate system: $C_2F=Z1*\cos \alpha$; formulating a sixth equation set in accordance with the geometric figure projection of the geometric positional relationship in the positive direction of the Y-axis of the dual-camera coordinate system: $FE=Z1*\cos \alpha*\tan \beta$; $KF=(X1/\cos \gamma-(Y1+X1*\tan \gamma)*\sin \gamma)*\tan \beta$; $SE=X1/\cos \gamma-(Y1+X1*\tan \gamma)*\sin \gamma+Z1*\cos \alpha*\tan \beta$; $SG=(X1/\cos \gamma-(Y1+X1*\tan \gamma)*\sin \gamma+Z1*\cos \alpha*\tan \beta)*\cos \beta$; $C_2K=Z1*\cos \alpha-(X1/\cos \gamma-(Y1+X1*\tan \gamma)*\sin \gamma)*\tan \beta$; $C_2G=(Z1*\cos \alpha-(X1/\cos \gamma-(Y1+X1*\tan \gamma)*\sin \gamma)*\tan \beta)*\cos \beta$; and solving the coordinate value SG of the dual camera in the X-axis and the coordinate value $C_2G$ of the dual camera in the Z-axis of the world coordinate system in accordance with the fourth equation set, the fifth equation set and the sixth equation set, when solving the mathematical equation set to acquire coordinate values of the dual camera on each coordinate axis of the world coordinate system. One specific implementation method for establishing the mathematical equation set based on geometric positional relationship is provided by this way, which facilitates to ensure further feasibility of the present disclosure. And in accordance with the established mathematical equation sets, the coordinate values of the dual camera in the X-axis, the Y-axis and the Z-axis of the world coordinate system are acquired, causing the result of the solution to be more accurate.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings represent similar elements. The figures in the accompanying drawings do not constitute a proportion limitation unless otherwise stated.

DETAILED DESCRIPTION

The embodiments of the present disclosure will be described in detail below with reference to the accompanying drawings in order to make the objectives, technical solutions and advantages of the present disclosure clearer. However, it will be apparent to those skilled in the art that, in the various embodiments of the present disclosure, numerous technical details are set forth in order to provide the reader with a better understanding of the present disclosure. However, the technical solutions claimed in the present disclosure may be implemented without these technical details and various changes and modifications based on the following embodiments.

One embodiment of a method for spatial positioning based on augmented reality provided by embodiments of the present disclosure is applied to an AR head-mounted device, wherein AR is short for Augmented Reality.

Figure 1:
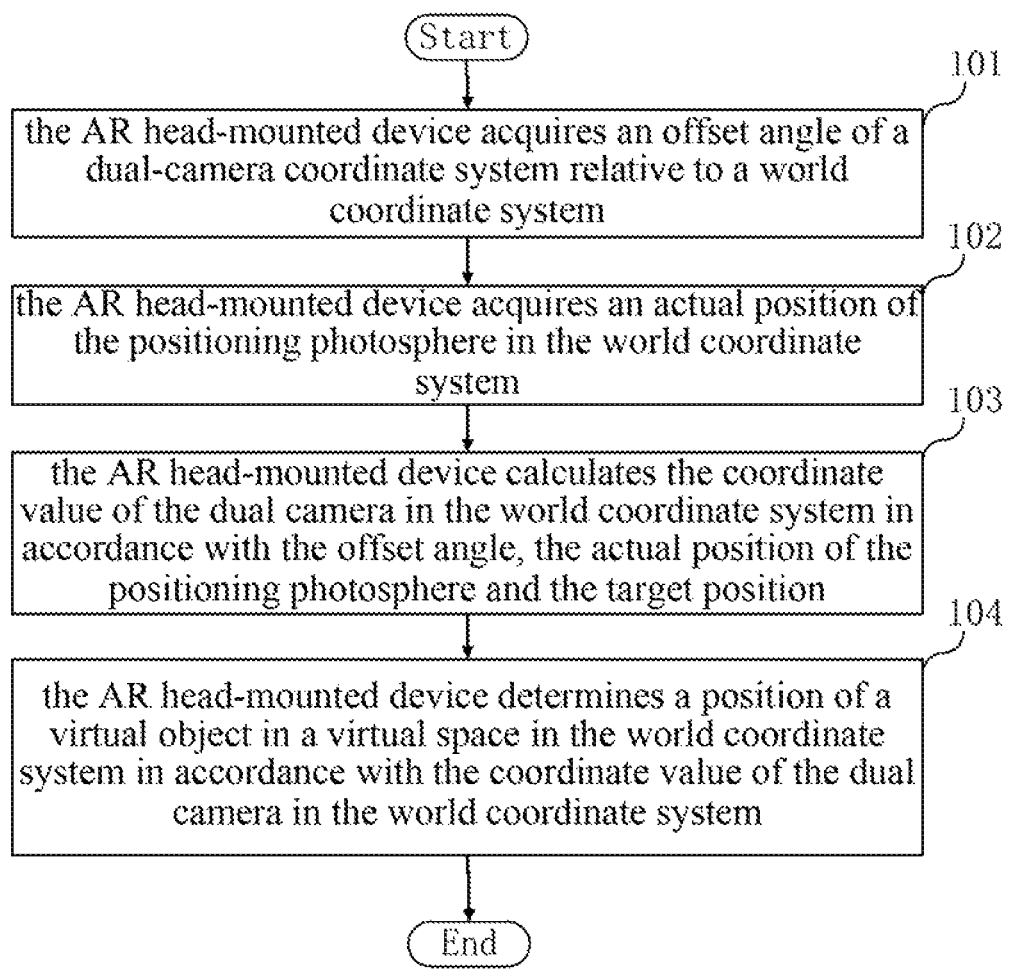
FIG. 1 is a flowchart of a method for spatial positioning based on augmented reality provided by an embodiment of the present disclosure.

As shown in FIG. 1, the method for spatial positioning based on augmented reality including:

In step 101, the AR head-mounted device acquires an offset angle of a dual-camera coordinate system relative to a world coordinate system.

Specifically, a dual camera is usually provided in the AR head-mounted device. And the AR head-mounted device may acquire the offset angles of the dual-camera coordinate system around the X-axis, the Y-axis and the Z-axis of the world coordinate system respectively relative to the world coordinate system. It is worth mentioning that the AR head-mounted device may be equipped with, but is not limited to, a gyroscope, and the above offset angle may be obtained through the gyroscope.

Here, the world coordinate system is a coordinate system that is preset by using a known target position of a positioning photosphere as a reference coordinate. Specifically, in practical application, the coordinate value of the known target position of the positioning photosphere may be defined as (0, Y0, 0), and the world coordinate system may be established based on it. It is worth mentioning that the value of Y0 may be designed as any value in accordance with an actual design requirement, and the specific value of Y0 is not limited in this embodiment.

In step 102, the AR head-mounted device acquires an actual position of the positioning photosphere in the world coordinate system.

Specifically, the AR head-mounted device may acquire an actual coordinate value of the positioning photosphere in the world coordinate system.

In step 103, the AR head-mounted device calculates the coordinate value of the dual camera in the world coordinate system in accordance with the offset angle, the actual position of the positioning photosphere and the target position.

In step 104, the AR head-mounted device determines a position of a virtual object in a virtual space in the world coordinate system in accordance with the coordinate value of the dual camera in the world coordinate system.

Specifically, in practical application, since the dual camera device may displace or rotate relative to the positioning photosphere, an object in a virtual scene may not coincide with the position of the positioning photosphere, thus causing the object in the virtual scene may not be tightly combined with an object in a real scene. Therefore, when the AR head-mounted device determines the position of the virtual object in the virtual space in the world coordinate system in accordance with the coordinate value of the dual camera in the world coordinate system, the virtual object may coincide with the position of the positioning photosphere, and the phenomenon that the virtual object may not be tightly combined with the real object in the real scene because the virtual object may not coincide with the position of the positioning photosphere is avoided.

Through the above content, it is not difficult to find that this embodiment may ensure that the virtual object in the virtual scene may coincide with the position of the positioning photosphere, avoiding the phenomenon that the virtual object may not be tightly combined with the real object in the real scene because the virtual object may not coincide with the position of the positioning photosphere, thus the close combination of the virtual object and the real object in the virtual scene may be ensured, which facilitates to match the users' needs.

Figure 2:
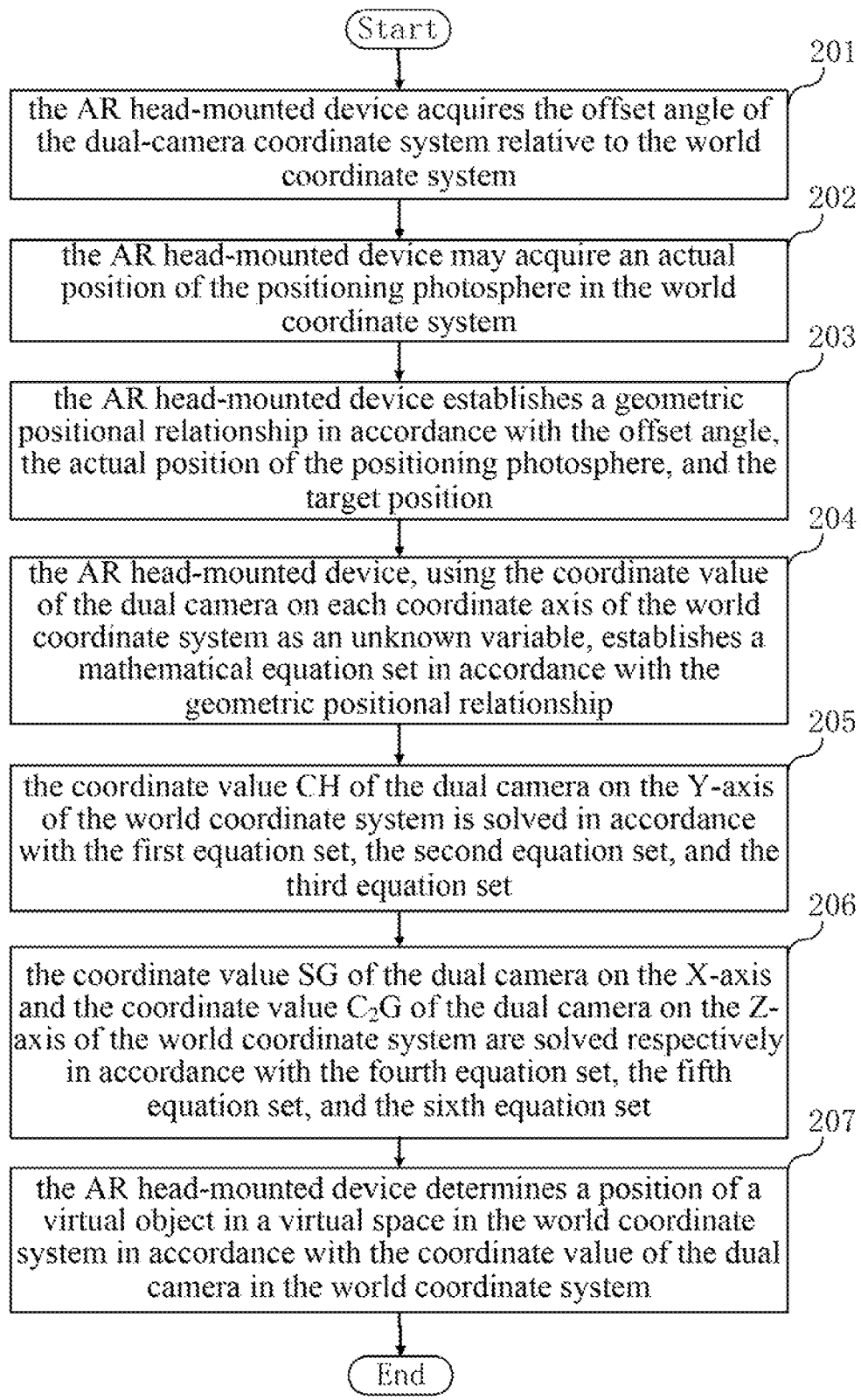
FIG. 2 is a flowchart of a method for spatial positioning based on augmented reality provided by an embodiment of the present disclosure.

In another embodiment of the method for spatial positioning based on augmented reality provided by embodiments of the present disclosure, as shown in FIG. 2, the method for spatial positioning based on augmented reality including:

In step 201, the AR head-mounted device acquires the offset angle of the dual-camera coordinate system relative to the world coordinate system.

Specifically, a dual camera is usually provided in the AR head-mounted device. And the AR head-mounted device may acquire the offset angles $\alpha$, $\beta$ and $\gamma$ of the dual-camera coordinate system around the X-axis, the Y-axis and the Z-axis of the world coordinate system respectively relative to the world coordinate system. It is worth mentioning that the AR head-mounted device may be equipped with, but is not limited to, a gyroscope, and the above offset angle may be obtained through the gyroscope.

Here, the world coordinate system is a coordinate system that is preset by using a known target position of a positioning photosphere as a reference coordinate. Specifically, in practical application, the coordinate value of the known target position of the positioning photosphere may be defined as (0, Y0, 0), and the world coordinate system may be established based on it. It is worth mentioning that the value of Y0 may be designed as any value in accordance with an actual design requirement, and the specific value of Y0 is not limited in this embodiment.

In step 202, the AR head-mounted device may acquire an actual position of the positioning photosphere in the world coordinate system.

Specifically, the AR head-mounted device may acquire an actual coordinate value (X1, Y1, Z1) of the positioning photosphere in the world coordinate system.

In step 203, the AR head-mounted device establishes a geometric positional relationship in accordance with the offset angle, the actual position of the positioning photosphere, and the target position.

Figure 3:
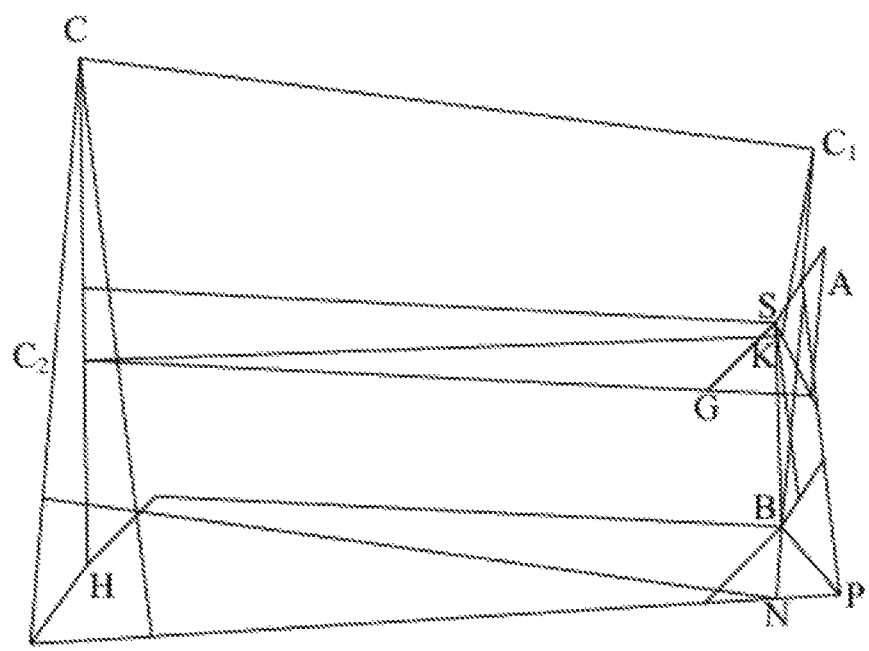
FIG. 3 is a schematic structural diagram of an established geometric positional relationship provided by an embodiment of the present disclosure.
Figure 4:
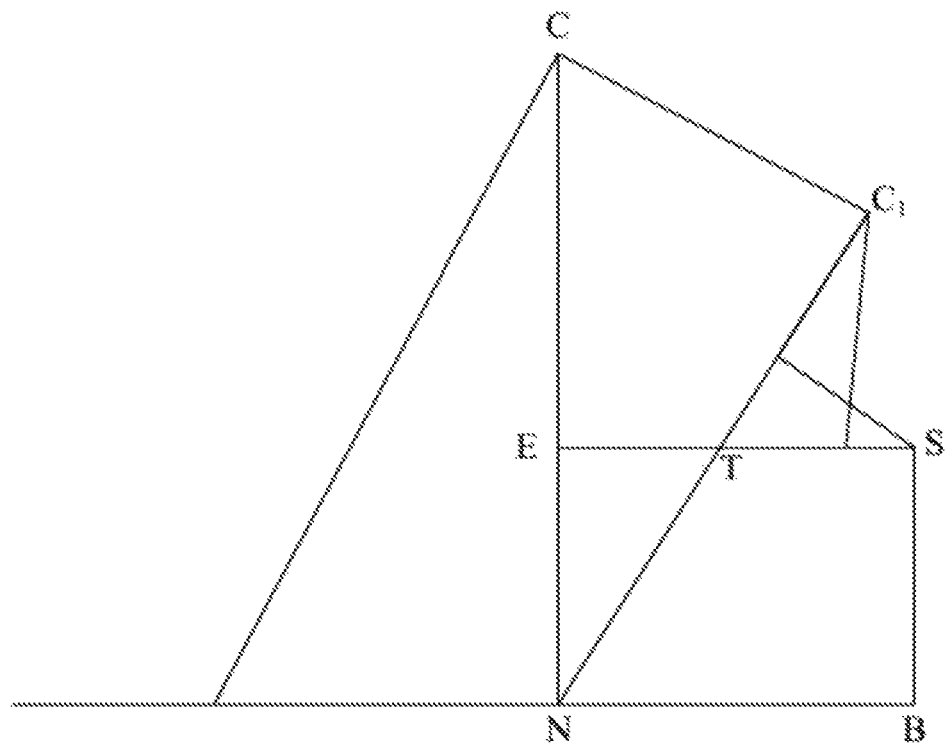
FIG. 4 is a schematic structural diagram of an established geometric positional relationship in another direction provided by an embodiment of the present disclosure.

Specifically, as shown in FIG. 3, making a projection point B of the target position S on the plane XY of the world coordinate system, making a point A, wherein a line passing through the point A and the actual position $C_1$ of the positioning photosphere is parallel to the Y-axis of a dual-camera coordinate system and the point A is separated from the $C_1$ by a length Y1, making an intersection point N of the $C_1A$ and the plane XY of the world coordinate system, wherein the actual position $C_1$ of the positioning photosphere is the offset coordinate (X1, Y1, Z1) in the world coordinate system relative to the target position S; making an intersection point P of the Y-axis in the dual-camera coordinate system and the plane XY of the world coordinate system; making a perpendicular of the plane XY of the world coordinate system through the position C of the dual camera to have intersection point H with the plane XY of the world coordinate system. As shown in FIG. 4, making an intersection point T by intersecting a line that passes through the S and is parallel to a line of NB with a line $C_1N$, wherein a line ST intersects with a preset plane at an intersection point E, and the preset plane is a plane that passes through a line CH and is parallel to a plane YZ of the world coordinate system; making the projection G of the S on the preset plane, making the perpendicular of the CH to pass through the $C_1$ and to intersect with the CH at J (J is not indicated in FIG. 3 and FIG. 4), making the plane XY of the world coordinate system through the S to intersect with the line CH at $C_2$, making the perpendicular of the line SE to pass through the $C_2$ and to intersect with the line SE at F (F is not indicated in FIG. 3 and FIG. 4). One specific implementation method for establishing the geometric positional relationship is provided by this way, which facilitates to ensure further feasibility of the present disclosure.

In step 204, the AR head-mounted device, using the coordinate value of the dual camera on each coordinate axis of the world coordinate system as an unknown variable, establishes a mathematical equation set in accordance with the geometric positional relationship.

Figure 5:
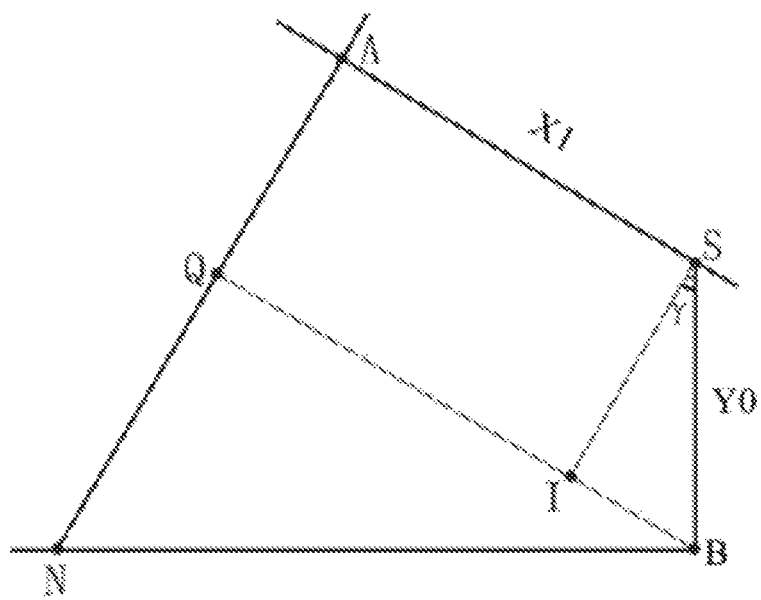
FIG. 5 is a geometric figure projection diagram of a schematic structural diagram of an established geometric positional relationship in a positive direction of Z-axis of a dual-camera coordinate system provided by an embodiment of the present disclosure.

Specifically, as shown in FIG. 5, formulating a first equation set in accordance with the geometric figure projection of the geometric positional relationship in the posi-tive direction of the Z-axis of the dual-camera coordinate system:

$QB=Y0*\text{Sin }\gamma+X;$ $NA=(Y0*\text{Sin }\gamma+X1)*\text{Tan }\gamma+Y0*\text{Cos }\gamma;$ It is not difficult to find that the length of AS is X1, where IS is perpendicular to BQ, BQ is perpendicular to AN, the angle between SB and IS is γ, and the length of SB is Y0. From this, it may be deduced: QB=BI+IQ=SB*Sin γ+AS=Y0*Sin γ+X1; NA=NQ+QA=QB*Tan γ+SI=(Y0*Sin γ+X1)*Tan γ+Y0*Cos γ. Here, Y0 is the reference coordinate value of the positioning photosphere, and the angle γ is the rotation angle of the dual-camera coordinate system around the Z-axis relative to the world coordinate system.

Figure 6:
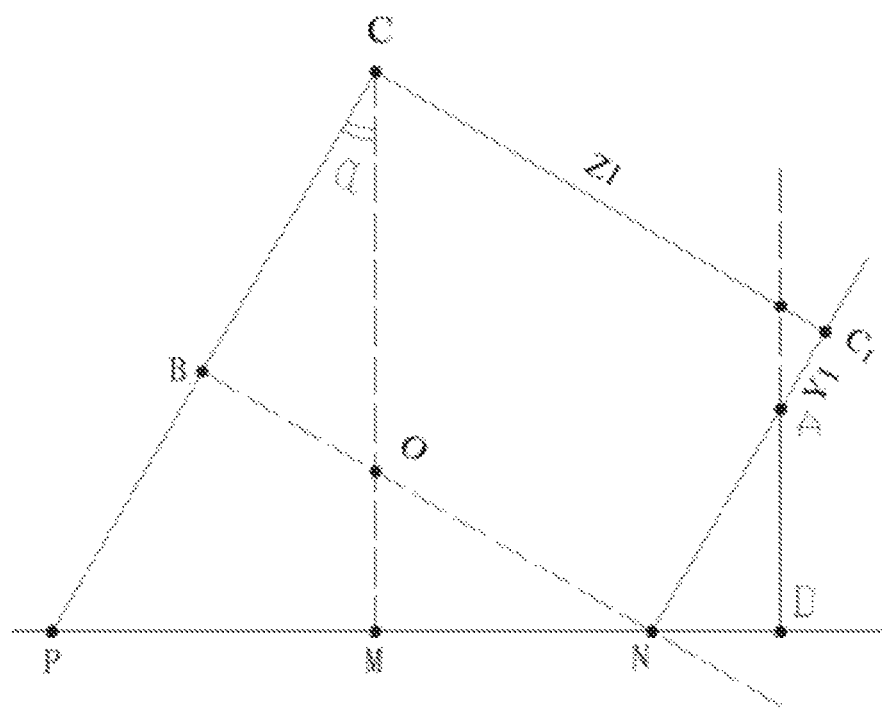
FIG. 6 is a geometric figure projection diagram of a schematic structural diagram of an established geometric positional relationship in a negative direction of X-axis of a dual-camera coordinate system provided by an embodiment of the present disclosure.

As shown in FIG. 6, formulating a second equation set in accordance with the geometric figure projection of the geometric positional relationship in the negative direction of X-axis of the dual-camera coordinate system, wherein, the intersection of BN and CM in FIG. 6 is O;

$NC_1=(Y0*\text{Cos }\gamma+(X1+Y0*\text{Sin }\gamma)*\text{Tan }\gamma)/\text{Cos }\alpha+Y1;$ $CP=Z1*\text{Tan }\alpha+(Y0*\text{Cos }\gamma+(X1+Y0*\text{Sin }\gamma)*\text{Tan }\gamma)/\text{Cos }\alpha+Y1;$ wherein, the α is the rotation angle of the dual-camera coordinate system around the X-axis relative to the world coordinate system. Specifically, N $C_1$=N A+A $C_1$=NA/Cos α+Y1=(Y0*Cos γ+(X1+Y0*Sin γ)*Tan γ)/Cos α+Y1; CP=PB+BC=BN*Tan α+BC=C $C_1$*Tan α+N $C_1$=Z1*Tan α+(Y0*Cos γ+(X1+Y0*Sin γ)*Tan γ)/Cos α+Y1.

Figure 7:
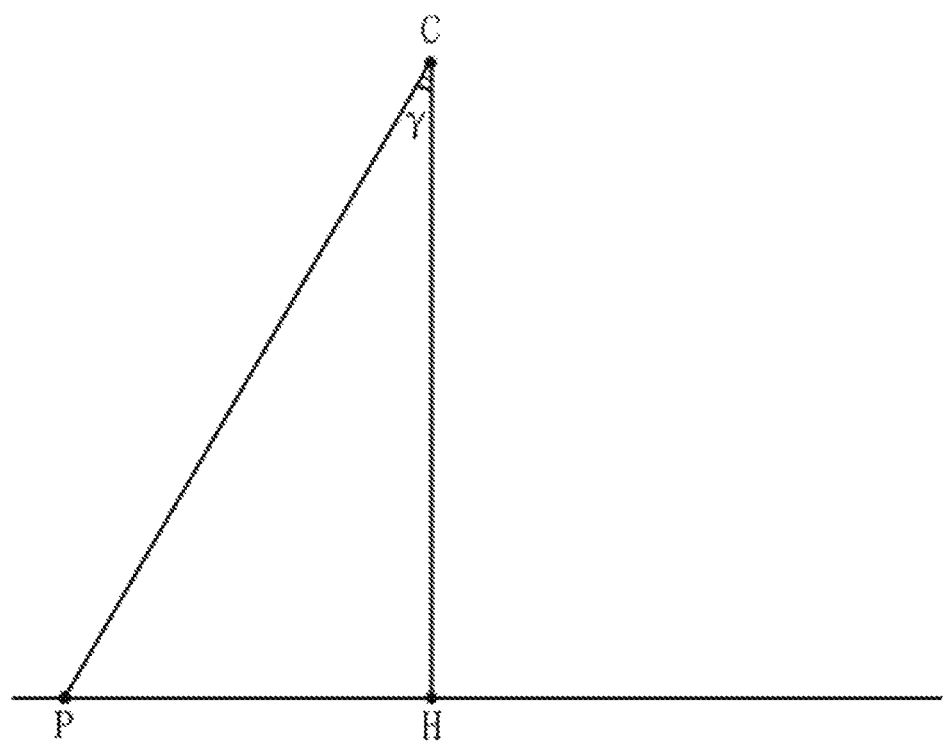
FIG. 7 is a geometric figure projection diagram of a schematic structural diagram of an established geometric positional relationship in a negative direction of Z-axis of a world coordinate system provided by an embodiment of the present disclosure.

As shown in FIG. 7, formulating a third equation set in accordance with the geometric figure projection of the geometric positional relationship in the negative direction of the Z-axis of the world coordinate system: CH=(Z1*Tan α+(Y0*Cos γ+(X1+Y0*Sin γ)*Tan γ)/Cos α+Y1)*Cos γ. Specifically, CH=CP*Cos γ=(Z1*Tan α+(Y0*Cos γ+(X L+Y0*Sin γ)*Tan γ)/Cos α+Y1)*Cos γ.

Figure 8:
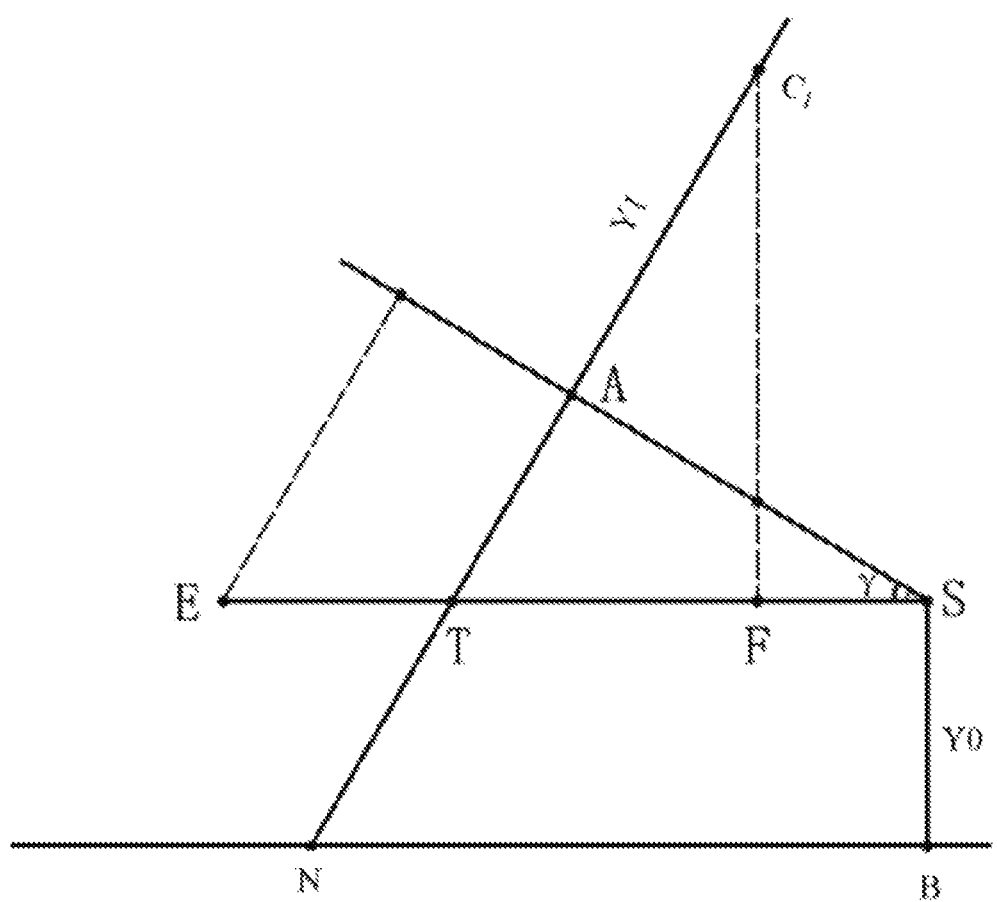
FIG. 8 is a geometric figure projection diagram of a schematic structural diagram of an established geometric positional relationship in a positive direction of Z-axis of a dual-camera coordinate system provided by an embodiment of the present disclosure.

As shown in FIG. 8, formulating a fourth equation set in accordance with the geometric figure projection of the geometric positional relationship in the positive direction of the Z-axis of the dual-camera coordinate system:

$AT=X1*\text{Tan }\gamma;$ $TF=(Y1+X1*\text{Tan }\gamma)*\text{Sin }\gamma;$ $SF=X/\text{Cos }\gamma-(Y1+X1*\text{Tan }\gamma)*\text{Sin }\gamma.$ It is not difficult to find that the length of the SA is X1 and the length of the $C_1A$ is Y1. Specifically, AT=SA*Tan γ=X1*Tan γ; TF=$C_1$T*Sin γ=($C_1$A+AT)*Sin γ=(Y1+X1*Tan γ)*Sin γ; SF=ST−TF=SA/Cos γ−TF=X1/Cos γ−(Y1+X1*Tan γ)*Sin γ.

Figure 9:
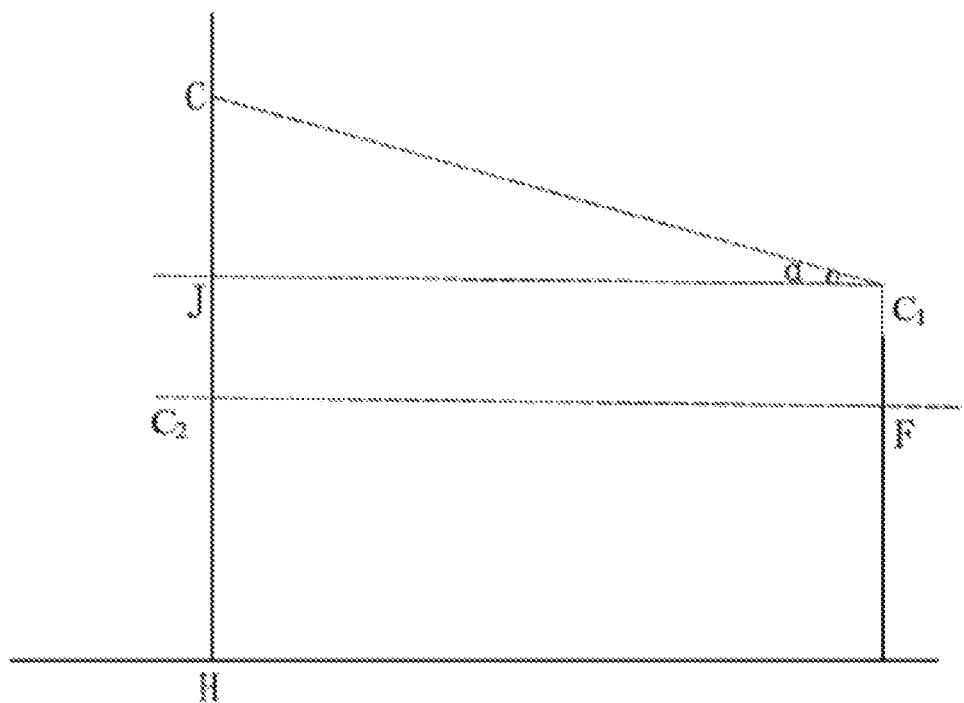
FIG. 9 is a geometric figure projection diagram of a schematic structural diagram of an established geometric positional relationship in a negative direction of X-axis of a world coordinate system provided by an embodiment of the present disclosure.

As shown in FIG. 9, formulating a fifth equation set in accordance with the geometric figure projection of the geometric positional relationship in the negative direction of the X-axis of the world coordinate system: $C_2F$=Z1*Cos α. It is not difficult to find that in FIG. 9, $C_1J$ is perpendicular to CH and intersects CH at point J, the angle between $C_1J$ and $CC_1$ is α, $C_2F$ is parallel to $C_1J$, and the length of $CC_1$ is Z1. From this, it may be deduced: $C_2F$=J $C_1$=C $C_1$*Cos α=Z1*Cos α.

Figure 10:
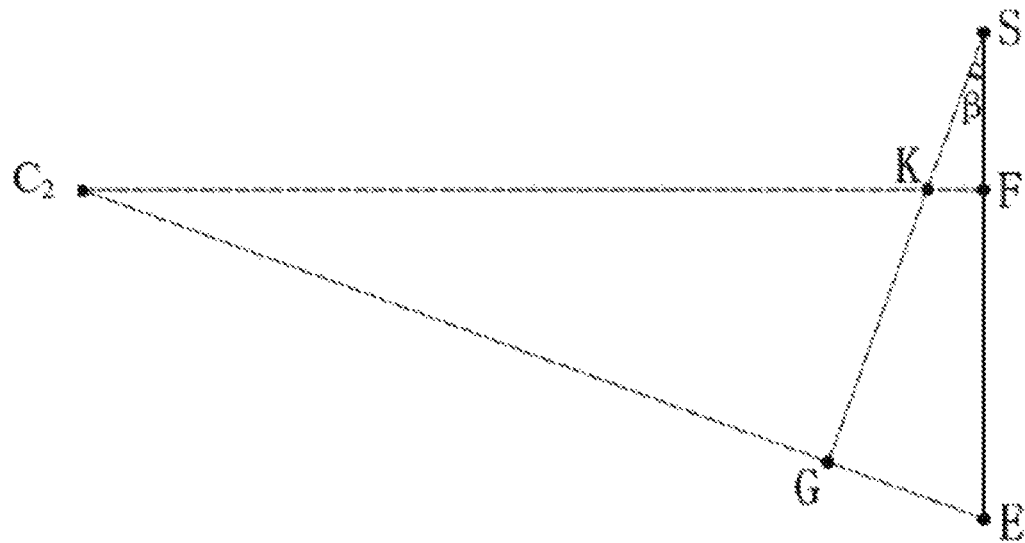
FIG. 10 is a geometric figure projection diagram of a schematic structural diagram of an established geometric positional relationship in a positive direction of Y-axis of a dual-camera coordinate system provided by an embodiment of the present disclosure.

As shown in FIG. 10, formulating a sixth equation set in accordance with the geometric figure projection of the geometric positional relationship in the positive direction of the Y-axis of the dual-camera coordinate system:

$FE=Z1*\text{Cos }\alpha*\text{Tan }\beta;$ $KF=(X1/\text{Cos }\gamma-(Y1+X1*\text{Tan }\gamma)*\text{Sin }\gamma)*\text{Tan }\beta;$ $SE=X1/\cos \gamma-(Y1+X1*\tan \gamma)*\sin \gamma+Z1*\cos \alpha*\tan \beta;$ $SG=(X1/\cos \gamma-(Y1+X1*\tan \gamma)*\sin \gamma+Z1*\cos \alpha*\tan \beta)*\cos \beta;$ $C_2K=Z1*\cos \alpha-(X1/\cos \gamma-(Y1+X1*\tan \gamma)*\sin \gamma)*\tan \beta;$ $C_2G=(Z1*\cos \alpha-(X1/\cos \gamma-(Y1+X1*\tan \gamma)*\sin \gamma)*\tan \beta)*\cos \beta.$ Specifically, $FE=C_2F*\tan \beta=Z1*\cos \alpha*\tan \beta$; $KF=SF*\tan \beta=(X1/\cos \gamma-(Y1+X1*\tan \gamma)*\sin \gamma)*\tan \beta$; $SE=SF+FE=X1/\cos \gamma-(Y1+X1*\tan \gamma)*\sin \gamma+Z1*\cos \alpha*\tan \beta$; $SG=SE*\cos \beta=(X1/\cos \gamma-(Y1+X1*\tan \gamma)*\sin \gamma+Z1*\cos \alpha*\tan \beta)*\cos \beta$; $C_2K=C_2F-KF=Z1*\cos \alpha-(X1/\cos \gamma-(Y1+X1*\tan \gamma)*\sin \gamma)*\tan \beta$; $C_2G=C_2K*\cos \beta=(Z1*\cos \alpha-(X1/\cos \gamma-(Y1+X1*\tan \gamma)*\sin \gamma)*\tan \beta)*\cos \beta.$ In step 205, the coordinate value CH of the dual camera on the Y-axis of the world coordinate system is solved in accordance with the first equation set, the second equation set, and the third equation set.

Specifically, $CH=(Z1*\tan \alpha+(Y0*\cos \gamma+(X+Y0*\sin \gamma)*\tan \gamma)/\cos \alpha+Y1)*\cos \gamma.$ In step 206, the coordinate value SG of the dual camera on the X-axis and the coordinate value $C_2G$ of the dual camera on the Z-axis of the world coordinate system are solved respectively in accordance with the fourth equation set, the fifth equation set, and the sixth equation set.

Specifically, $SG=(X1/\cos \gamma-(Y1+X1*\tan \gamma)*\sin \gamma+Z1*\cos \alpha*\tan \beta)*\cos \beta.$ $C_2G=(Z1*\cos \alpha-(X1/\cos \gamma-(Y1+X1*\tan \gamma)*\sin \gamma)*\tan \beta)*\cos \beta.$ One specific implementation method for establishing the mathematical equation set based on geometric positional relationship is provided by this way, which facilitates to ensure further feasibility of the present disclosure. And in accordance with the established mathematical equation sets, the coordinate values of the dual camera in the X-axis, the Y-axis and the Z-axis of the world coordinate system are acquired, causing the result of the solution to be more accurate.

It is worth mentioning that the step 205 is not limited to being executed before step 206. The SG and $C_2G$ may be solved first before the CH is solved.

In step 207, the AR head-mounted device determines a position of a virtual object in a virtual space in the world coordinate system in accordance with the coordinate value of the dual camera in the world coordinate system.

Specifically, the position of the virtual object in the virtual space in the world coordinate system is determined in accordance with the coordinate value (SG, CH, $C_2G$) of the dual camera in the world coordinate system. It is worth mentioning that, in practical application, since the dual camera device may displace or rotate relative to the positioning photosphere, an object in a virtual scene may not coincide with the position of the positioning photosphere, thus causing the object in the virtual scene may not be tightly combined with an object in a real scene. Therefore, when the AR head-mounted device determines the position of the virtual object in the virtual space in the world coordinate system in accordance with the coordinate value of the dual camera in the world coordinate system, the virtual object may coincide with the position of the positioning photosphere, and the phenomenon that the virtual object may not be tightly combined with the real object in the real scene because the virtual object may not coincide with the position of the positioning photosphere is avoided.

Through the above content, it is not difficult to find that this embodiment may ensure that the virtual object in the virtual scene may coincide with the position of the positioning photosphere, avoiding the phenomenon that the virtual object may not be tightly combined with the real object in the real scene because the virtual object may not coincide with the position of the positioning photosphere, thus the close combination of the virtual object and the real object in the virtual scene may be ensured, which facilitates to match the users' needs.

The step division of the above methods is only for the sake of clear description, and may be combined into one step or split into several steps during implementation. As long as the same logical relationship is included, it is within the protection scope of this patent. The addition of insignificant modifications or the introduction of an insignificant design to an algorithm or process, without changing the core design of the algorithm and process, is within the protection scope of the patent.

Figure 11:
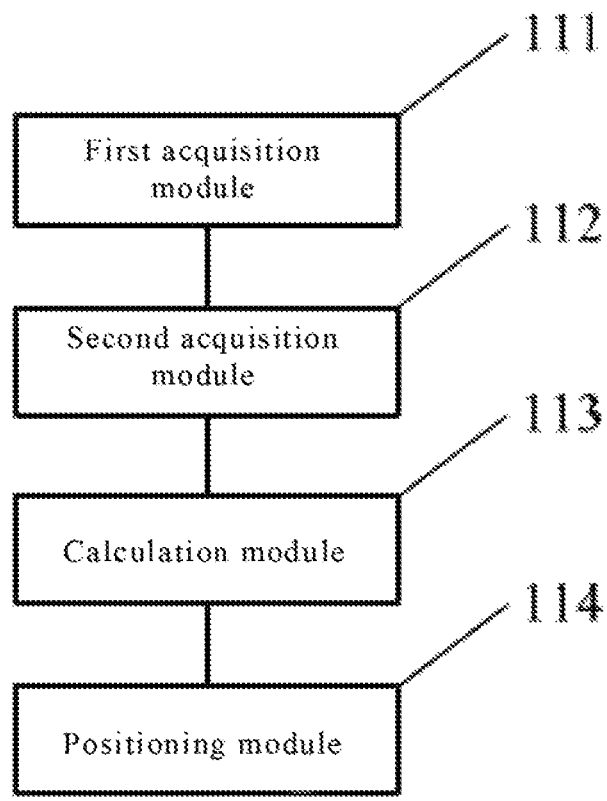
FIG. 11 is a block diagram of an apparatus for spatial positioning based on augmented reality provided by an embodiment of the present disclosure.

In one embodiment of an apparatus for spatial positioning based on augmented reality provided by embodiments of the present disclosure, as shown in FIG. 11, the apparatus for spatial positioning based on augmented reality including: a first acquisition module 11, configured to acquire an offset angle of a dual-camera coordinate system relative to a world coordinate system; wherein, the world coordinate system is a coordinate system that is preset by using a known target position of a positioning photosphere as a reference coordinate; a second acquisition module 112, configured to acquire an actual position of the positioning photosphere in the world coordinate system; a calculation module 113, configured to calculate a coordinate value of the dual camera in the world coordinate system in accordance with the offset angle, the actual position of the positioning photosphere, and the target position; and a positioning module 114, configured to determine a position of a virtual object in a virtual space in the world coordinate system in accordance with the coordinate value of the dual camera in the world coordinate system.

Through the above content, it is not difficult to find that this embodiment may ensure that the virtual object in the virtual scene may coincide with the position of the positioning photosphere, avoiding the phenomenon that the virtual object may not be tightly combined with the real object in the real scene because the virtual object may not coincide with the position of the positioning photosphere, thus the close combination of the virtual object and the real object in the virtual scene may be ensured, which facilitates to match the users' needs.

It is worth mentioning that each module involved in this embodiment is a logic module. In practical application, one logic unit may be one physical unit, a part of one physical unit, or a combination of multiple physical units. Further, in order to highlight the innovative part of the present disclosure, this embodiment does not introduce a unit that is not closely related to solving the technical problems raised in the present disclosure, but this does not mean that there are no other units in this embodiment.

Figure 12:
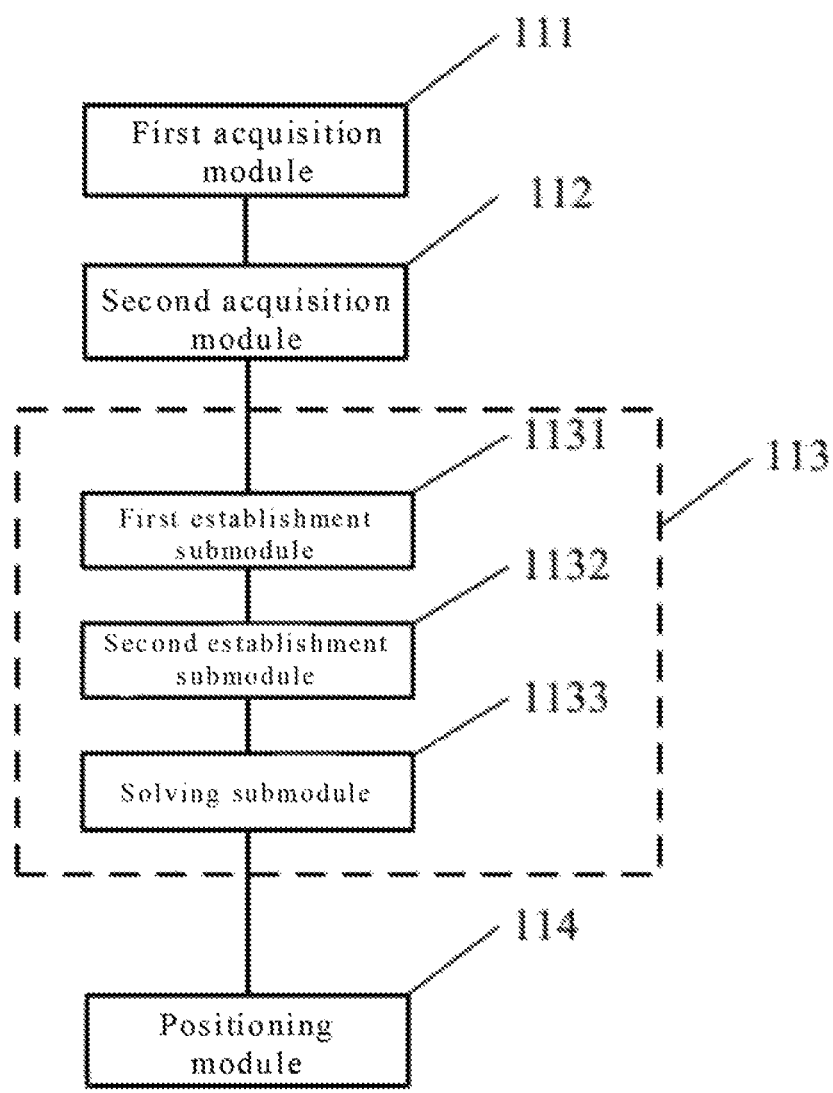
FIG. 12 is a block diagram of an apparatus for spatial positioning based on augmented reality provided by an embodiment of the present disclosure.

In another embodiment of the apparatus for spatial positioning based on augmented reality provided by embodiments of the present disclosure, as shown in FIG. 12, the apparatus for spatial positioning based on augmented reality including: a first acquisition module 111, configured to acquire an offset angle of a dual-camera coordinate system relative to a world coordinate system; wherein, the world coordinate system is a coordinate system that is preset by using a known target position of a positioning photosphere as a reference coordinate; a second acquisition module 112, configured to acquire an actual position of the positioning photosphere in the world coordinate system; a calculation module 113, configured to calculate a coordinate value of the dual camera in the world coordinate system in accordance with the offset angle, the actual position of the positioning photosphere, and the target position; and a positioning module 114, configured to determine a position of a virtual object in a virtual space in the world coordinate system in accordance with the coordinate value of the dual camera in the world coordinate system.

Further, the calculation module 113 including: a first establishing submodule 1131, configured to establish a geometric positional relationship in accordance with the offset angle, the actual position of the positioning photosphere, and the target position; a second establishing submodule 1132, configured to take the coordinate value of the dual camera on each coordinate axis of the world coordinate system as an unknown variable and establish a mathematical equation set in accordance with the geometric positional relationship; and a solving submodule 1133, configured to solve the mathematical equation set to acquire the coordinate value of the dual camera on each coordinate axis of the world coordinate system.

Further, the first establishment submodule specifically configured to make a projection point B of a target position S on a plane XY of the world coordinate system, make a point A, wherein a line passing through the point A and an actual position $C_1$ of the positioning photosphere is parallel to a Y-axis of a dual-camera coordinate system and the point A is separated from the $C_1$ by a length Y1, make an intersection point N of the $C_1$A and the plane XY of the world coordinate system, wherein the actual position $C_1$ of the positioning photosphere is the offset coordinate (X1, Y1, Z1) in the world coordinate system relative to the target position S; make an intersection point P of the Y-axis in the dual-camera coordinate system and the plane XY of the world coordinate system; make a perpendicular of the plane XY of the world coordinate system through the position C of the dual camera DE to have an intersection point H with the plane XY of the world coordinate system; make an intersection point T by intersecting a line that passes through the S and is parallel to a line of NB with a line $C_1$N, wherein a line ST intersects with a preset plane at an intersection point E, and the preset plane is a plane that passes through a line CH and is parallel to a plane YZ plane of the world coordinate system; and make the projection G of the S on the preset plane, make the perpendicular of the CH to pass through the $C_1$, and to intersect with the CH at J, make the plane XY of the world coordinate system through the S to intersect with the line CH at $C_2$, make the perpendicular of the line SE to pass through the $C_2$ and to intersect with the line SE at F.

Further, the second establishing submodule including: a first formulating equation module, configured to formulate a first equation set in accordance with the geometric figure projection of the geometric positional relationship in the positive direction of the Z-axis of the dual-camera coordinate system: QB=Y0*Sin γ+X1; NA=(Y0*Sin γ+X1)*Tan γ+Y0*Cos γ; wherein Y0 is a reference coordinate value of the positioning photosphere, and an angle Y is a rotation angle of the dual-camera coordinate system around the Z-axis relative to the world coordinate system; a second formulating equation module, configured to formulate a second equation set in accordance with the geometric figure projection of the geometric positional relationship in the negative direction of the X-axis of the dual-camera coordinate system: N $C_1$=(Y0*Cos γ+(X1+Y0*Sin γ)*Tan γ)/Cos α+Y1; CP=Z1*Tan α+(Y0*Cos γ+(X1+Y0*Sin γ)*Tan γ)/Cos α+Y1; wherein, the α is the rotation angle of the dual-camera coordinate system around the X-axis relative to the world coordinate system; a third formulating equation module, configured to formulate a third equation set in accordance with the geometric figure projection of the geometric positional relationship in the negative direction of the Z-axis of the world coordinate system: CH=(Z1*Tan α+(Y0*Cos γ+(X1+Y0*Sin γ)*Tan γ)/Cos α+Y1)*Cos γ; the solving submodule, specifically configured to solve a coordinate value CH of the dual camera on the Y-axis of the world coordinate system in accordance with the first equation set, the second equation set, and the third equation set. The second establishing submodule further including: a fourth formulating equation module, configured to formulate a fourth equation set in accordance with the geometric figure projection of the geometric positional relationship in the positive direction of the Z-axis of the dual-camera coordinate system: AT=X1*Tan γ; TF=(Y1+X1*Tan γ)*Sin γ; SF=X1/Cos γ−(Y1+X1*Tan γ)*Sin γ; a fifth formulating equation module, configured to formulate a fifth equation set in accordance with the geometric figure projection of the geometric positional relationship in the negative direction of the X-axis of the world coordinate system: $C_2$F=Z1*Cos α; a sixth formulating equation module, configured to formulate a sixth equation set in accordance with the geometric figure projection of the geometric positional relationship in the positive direction of the Y-axis of the dual-camera coordinate system: FE=Z1*Cos α*Tan β; KF=(X1/Cos γ−(Y1+X1*Tan γ)*Sin γ)*Tan β; SE=X1/Cos γ−(Y1+X1*Tan γ)*Sin γ+Z1*Cos α*Tan β; SG=(X1/Cos γ−(Y1+X1*Tan γ)*Sin γ+Z1*Cos α*Tan β)*Cos β; $C_2$K=Z1*Cos α−(X1/Cos γ−(Y1+X1*Tan γ)*Sin γ)*Tan γ; $C_2$G=(Z1*Cos α−(X1/Cos γ−(Y1+X1*Tan γ)*Sin γ)*Tan β)*Cos β; and the solving submodule, specifically further configured to solve the coordinate value SG of the dual camera in the X-axis and the coordinate value $C_2$G of the dual camera in the Z-axis of the world coordinate system in accordance with the fourth equation set, the fifth equation set, and the sixth equation set.

Through the above content; it is not difficult to find that this embodiment may ensure that the virtual object in the virtual scene may coincide with the position of the positioning photosphere, avoiding the phenomenon that the virtual object may not be tightly combined with the real object in the real scene because the virtual object may not coincide with the position of the positioning photosphere, thus the close combination of the virtual object and the real object in the virtual scene may be ensured, which facilitates to match the users' needs.

Figure 13:
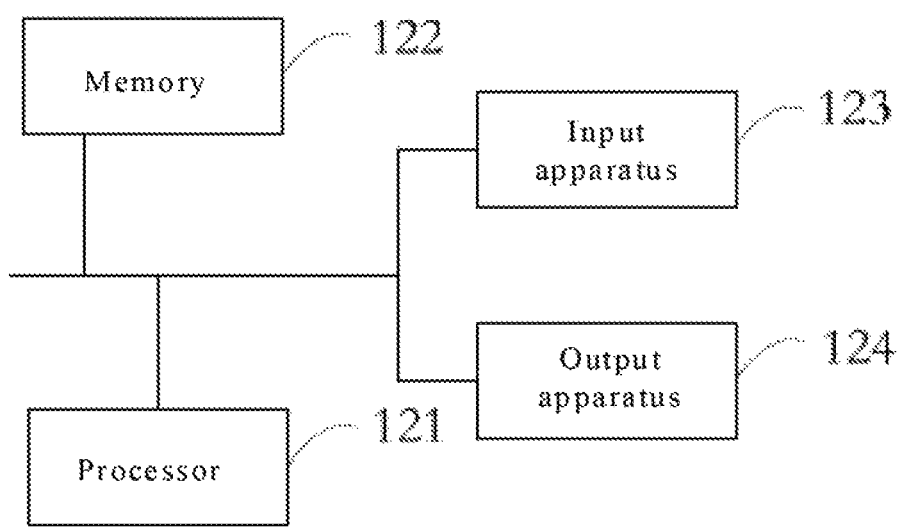
FIG. 13 is a schematic structural diagram of an electronic device provided by an embodiment of the present disclosure.

Please refer to FIG. 13, a schematic structural diagram of a hardware of a method for spatial positioning based on augmented reality provided by an embodiment of the present disclosure. The electronic device including:

one or more processors 121 and a memory 122, with one processor 121 as an example in FIG. 13.

The apparatus of the method for spatial positioning based on augmented reality may further including: an input apparatus 123 and an output apparatus 124.

The processor 121, the memory 122, the input apparatus 123, and the output apparatus 124 may be connected by a bus or other means, as exemplified by a bus connection in FIG. 13.

The memory 122, as a non-transitory computer-readable storage medium, may be used to store a non-transitory software program, a non-transitory computer-executable program, and a module, such as the program instructions/ modules corresponding to the method for spatial positioning based on augmented reality in this embodiment. The processor 121 executes various functional applications and data processing of a server by running the non-transitory software program, the instructions and modules stored in the memory 122, that is, realizing the method for spatial positioning based on augmented reality in the forgoing method embodiments.

The memory 122 may include a program storage area and a data storage area, wherein the program storage area may store an operating system, an application required by at least one function; The storage data area may store data or the like created in accordance with the use of the method for spatial positioning based on augmented reality. Further, the memory 122 may include a high-speed random access memory, and may also include a non-transitory memory, such as at least one magnetic disk storage device, flash memory device, or other non-transitory solid-state storage devices. In some embodiments, the memory 122 may optionally include a memory remotely disposed with respect to the processor 121, these remote memories may be connected to the apparatus for spatial positioning based on augmented reality by a network. Examples of the forgoing networks include, but are not limited to, the Internet, an intranet, a local area network, a mobile communication network, and combinations thereof.

The input device 123 may receive an input digital or character information and generate a key signal input related to user settings and function control of the apparatus for spatial positioning based on augmented reality. The output device 124 may include a display device such as a display screen.

The one or more modules are stored in the memory 122, and when executed by the one or more processors 121, the method for spatial positioning based on augmented reality in any of the forgoing method embodiments is executed.

The forgoing products may execute the method for spatial positioning based on augmented reality provided by any embodiment of the present disclosure, and have the corresponding functional modules and beneficial effects of the execution method. For technical details not described in this embodiment, the method for spatial positioning based on augmented reality may be referred to.

The electronic device of this embodiment exists in various forms, including but not limited to:

(1) A mobile communication device: Such devices are characterized by a mobile communication function and are mainly aimed at providing a voice and data communication. Such terminals include a smart phone (such as an iPhone), a multimedia phone, a functional phone, and a low-end phone, etc.

(2) An ultra-mobile personal computer device: Such devices belonging to the category of personal computers, have a computing and processing function, and generally have a characteristic of mobile Internet access. Such terminals include a PDA, a MID, and an UMPC device, etc., such as an iPad.

(3) A portable entertainment device: Such devices may display and play multimedia content. Such devices include an audio/video player (such as an iPod), a handheld game console, an e-book, and a smart toy and a portable vehicle navigation device.

(4) A server: A device providing a computing service. The composition of the server includes a processor, a hard disk, a memory, a system bus, etc. The server is similar to a general computer architecture, but due to the need to provide a highly reliable service, it requires a higher processing capacity, stability, reliability, security, scalability, manageability, etc.

(5) Other electronic devices with data interaction functions.

Compared with the existing technologies, the beneficial effects of this embodiment are as follows: Through acquiring an offset angle of the dual-camera coordinate system relative to the world coordinate system; acquiring an actual position of the positioning photosphere in the world coordinate system; calculating the coordinate value of the dual camera in the world coordinate system in accordance with the offset angle, the actual position of the positioning photosphere, and the target position; determining the position of a virtual object in a virtual space in the world coordinate system in accordance with the coordinate value of the dual camera in the world coordinate system, it may ensure that the virtual object in the virtual scene may coincide with the position of the positioning photosphere, avoiding the phenomenon that the virtual object may not be tightly combined with the real object in the real scene because the virtual object may not coincide with the position of the positioning photosphere, thus the close combination of the virtual object and the real object in the virtual scene may be ensured, which facilitates to match the users' needs.

An embodiment of the present disclosure further relates to a non-transitory computer-readable storage medium storing a computer-executable instruction, the computer-executable instruction configured to cause the computer to execute the method for spatial positioning based on augmented reality in any of the forgoing method embodiments.

Compared with the existing technologies, the beneficial effects of this embodiment are as follows: Through acquiring an offset angle of the dual-camera coordinate system relative to the world coordinate system; acquiring an actual position of the positioning photosphere in the world coordinate system; calculating the coordinate value of the dual camera in the world coordinate system in accordance with the offset angle, the actual position of the positioning photosphere, and the target position; determining the position of a virtual object in a virtual space in the world coordinate system in accordance with the coordinate value of the dual camera in the world coordinate system, it may ensure that the virtual object in the virtual scene may coincide with the position of the positioning photosphere, avoiding the phenomenon that the virtual object may not be tightly combined with the real object in the real scene because the virtual object may not coincide with the position of the positioning photosphere, thus the close combination of the virtual object and the real object in the virtual scene may be ensured, which facilitates to match the users' needs.

An embodiment of the present disclosure relates to a computer program product, including: a computing program stored on a non-transitory computer-readable storage medium, the computer program including a program instruction, when the program instruction is executed by a computer, causing the computer to execute the method for spatial positioning based on augmented reality in any of forgoing method embodiments.

Compared with the existing technologies, the beneficial effects of this embodiment are as follows: Through acquiring an offset angle of the dual-camera coordinate system relative to the world coordinate system; acquiring an actual position of the positioning photosphere in the world coordinate system; calculating the coordinate value of the dual camera in the world coordinate system in accordance with the offset angle, the actual position of the positioning photosphere, and the target position; determining the position of a virtual object in a virtual space in the world coordinate system in accordance with the coordinate value of the dual camera in the world coordinate system, it may ensure that the virtual object in the virtual scene may coincide with the position of the positioning photosphere, avoiding the phenomenon that the virtual object may not be tightly combined with the real object in the real scene because the virtual object may not coincide with the position of the positioning photosphere, thus the close combination of the virtual object and the real object in the virtual scene may be ensured, which facilitates to match the users' needs.

Those skilled in the art may understand that all or part of the steps of the method in the aforementioned embodiments may be realized by a program instructing related hardware. The program stored in a storage medium, including several instructions to cause a device (which may be a single chip microcomputer, a chip, etc.) or a processor to execute all or part of the steps of the method in various embodiments of the present disclosure. The aforementioned storage medium includes: a U-disk, a mobile hard disk, a Read-Only Memory (ROM), a Random Access Memory (RAM), a magnetic disk or an optical disk and other medium that may store a program code.

Those skilled in the art should appreciate that the aforementioned embodiments are specific embodiments for implementing the present disclosure. In practice, however, various changes may be made in the forms and details of the specific embodiments without departing from the spirit and scope of the present disclosure.

What is claimed is:

1. An augmented reality based method for spatial positioning, comprising:
   acquiring an offset angle of a dual-camera coordinate system relative to a world coordinate system, wherein the world coordinate system is a coordinate system that is preset by using a known target position of a positioning photosphere as a reference coordinate;
   acquiring an actual position of the positioning photosphere in the world coordinate system;
   calculating a coordinate value of the dual camera in the world coordinate system in accordance with the offset angle, the actual position of the positioning photosphere, and the target position; and
   determining a position of a virtual object in a virtual space in the world coordinate system in accordance with the coordinate value of the dual camera in the world coordinate system;
   wherein the step of calculating of a coordinate value of the dual camera in the world coordinate system in accordance with the offset angle, the actual position of the positioning photosphere and the target position, comprises:
   establishing a geometric positional relationship in accordance with the offset angle, the actual position of the positioning photosphere and the target position;
   establishing a mathematical equation set in accordance with the geometric positional relationship, wherein a coordinate value of the dual camera on each coordinate axis of the world coordinate system is an unknown variable of the mathematical equation set; and
   solving the mathematical equation set to acquire the coordinate value of the dual camera on each coordinate axis of the world coordinate system.

2. The augmented reality based method in accordance with claim 1, wherein the step of establishing the geometric positional relationship in accordance with the offset angle, the actual position of the positioning photosphere and the target position, comprises:
   making a projection point B of a target position S on a plane XY of the world coordinate system, making a point A, wherein a line passing through the point A and an actual position C1 of the positioning photosphere is parallel to the Y-axis of a dual-camera coordinate system and the point A is separated from the C1 by a length Y1, making an intersection point N of the C1A and the plane XY of the world coordinate system, wherein the actual position C1 of the positioning photosphere is the offset coordinate (X1, Y1, Z1) in the world coordinate system relative to the target position S;
   making an intersection point P of the Y axis in the dual-camera coordinate system and the plane XY of the world coordinate system;
   making a perpendicular of the plane XY of the world coordinate system through the position C of the dual camera to have an intersection point H with the plane XY of the world coordinate system;
   making an intersection point T by intersecting a line that passes through the S and is parallel to a line NB with a line C1N, wherein a line ST intersects with a preset plane at an intersection point E, and the preset plane is a plane that passes through a line CH and is parallel to a plane YZ of the world coordinate system; and
   making the projection G of the S on the preset plane, making the perpendicular of the CH to pass through the C1, and to intersect with the CH at J, making the plane XY of the world coordinate system through the S to intersect with the line CH at C2, making the perpendicular of the line SE to pass through the C2 and to intersect with the line SE at F.

3. The augmented reality based method for spatial positioning based on augmented reality in accordance with claim 2, wherein the step of establishing a mathematical equation set in accordance with the geometric positional relationship, comprises:
   formulating a first equation set in accordance with the geometric figure projection of the geometric positional relationship in the positive direction of the Z-axis of the dual-camera coordinate system:

$QB = Y0*\text{Sin } \gamma + X1$;

$NA = (Y0*\text{Sin } \gamma + X1)*\text{Tan } \gamma + Y0*\text{Cos } \gamma$, wherein Y0 is a reference coordinate value of the positioning photosphere, and an angle γ is a rotation angle of the dual-camera coordinate system around the Z-axis relative to the world coordinate system;
   formulating a second equation set in accordance with the geometric figure projection of the geometric positional relationship in the negative direction of the X-axis of the dual-camera coordinate system:

$N\,C1 = (Y0*\text{Cos } \gamma + (X1 + Y0*\text{Sin } \gamma)*\text{Tan } \gamma)/\text{Cos } \alpha + Y1$;

$CP = Z1*\text{Tan } \alpha + (Y0*\text{Cos } \gamma + (X1 + Y0*\text{Sin } \gamma)*\text{Tan } \gamma)/\text{Cos } \alpha + Y1$;

wherein the α is a rotation angle of the dual-camera coordinate system around the X-axis relative to the world coordinate system;
   formulating a third equation set in accordance with the geometric figure projection of the geometric positional relationship in the negative direction of the Z-axis of the world coordinate system:

$CH = (Z1*\text{Tan } \alpha + (Y0*\text{Cos } \gamma + (X1 + Y0*\text{Sin } \gamma)*\text{Tan } \gamma)/\text{Cos } \alpha + Y1)*\text{Cos } \gamma$;

solving a coordinate value CH of the dual camera on the Y-axis of the world coordinate system in accordance with the first equation set, the second equation set and the third equation set, when solving the mathematical equation set to acquire coordinate values of the dual camera on each coordinate axis of the world coordinate system;

formulating a fourth equation set in accordance with the geometric figure projection of the geometric positional relationship in the positive direction of the Z-axis of the dual-camera coordinate system:

$AT = X1*\text{Tan } \gamma;$ $TF = (Y1 + X1*\text{Tan } \gamma)*\text{Sin } \gamma;$ $SF := X1/\text{Cos } \gamma - (Y1 + X1*\text{Tan } \gamma)*\text{Sin } \gamma;$ formulating a fifth equation set in accordance with the geometric figure projection of the geometric positional relationship in the negative direction of the X-axis of the world coordinate system:

$C2F = Z1*\text{Cos } \alpha;$ formulating a sixth equation set in accordance with the geometric figure projection of the geometric positional relationship in the positive direction of the Y-axis of the dual-camera coordinate system:

$FE = Z1*\text{Cos } \alpha*\text{Tan } \beta;$ $KF = (X1/\text{Cos } \gamma - (Y1 + X1*\text{Tan } \gamma)*\text{Sin } \gamma)*\text{Tan } \beta;$ $SE = X1/\text{Cos } \gamma - (Y1 + X1*\text{Tan } \gamma)*\text{Sin } \gamma + Z1*\text{Cos } \alpha*\text{Tan } \beta;$ $SG = (X1/\text{Cos } \gamma - (Y1 + X1*\text{Tan } \gamma)*\text{Sin } \gamma + Z1*\text{Cos } \alpha*\text{Tan } \beta)*\text{Cos } \beta;$ $C2K = Z1*\text{Cos } \alpha - (X1/\text{Cos } \gamma - (Y1 + X1*\text{Tan } \gamma)*\text{Sin } \gamma)*\text{Tan } \beta;$ $C2G = (Z1*\text{Cos } \alpha - (X1/\text{Cos } \gamma - (Y1 + X1*\text{Tan } \gamma)*\text{Sin } \gamma)*\text{Tan } \beta)*\text{Cos } \beta;$ and solving the coordinate value SG of the dual camera in the X-axis and the coordinate value C2G of the dual camera in the Z-axis of the world coordinate system in accordance with the fourth equation set, the fifth equation set and the sixth equation set, when solving the mathematical equation set to acquire coordinate values of the dual camera on each coordinate axis of the world coordinate system.

4. An electronic device, comprising:

at least one processor; and, a memory communicatively connected to the at least one processor, wherein the memory stores instructions which, when executed by the at least one processor, cause the at least one processor to:

acquire an offset angle of a dual-camera coordinate system relative to a world coordinate system, wherein the world coordinate system is a coordinate system that is preset by using a known target position of a positioning photosphere as a reference coordinate;

acquire an actual position of the positioning photosphere in the world coordinate system;

calculate a coordinate value of the dual camera in the world coordinate system in accordance with the offset angle, the actual position of the positioning photosphere and the target position; and determine a position of a virtual object in a virtual space in the world coordinate system in accordance with the coordinate value of the dual camera in the world coordinate system;

wherein to calculate a coordinate value of the dual camera in the world coordinate system in accordance with the offset angle, the actual position of the positioning photosphere and the target position, the instructions cause the at least one processor to:

establish a geometric positional relationship in accordance with the offset angle, the actual position of the positioning photosphere and the target position;

establish a mathematical equation set in accordance with the geometric positional relationship, wherein a coordinate value of the dual camera on each coordinate axis of the world coordinate system is an unknown variable of the mathematical equation set; and solve the mathematical equation set to acquire the coordinate value of the dual camera on each coordinate axis of the world coordinate system.

5. The electronic device in accordance with claim 1, wherein to establish the geometric positional relationship in accordance with the offset angle, the actual position of the positioning photosphere and the target position, the instructions cause the at least one processor to:

make a projection point B of a target position S on a plane XY of the world coordinate system, make a point A, wherein a line passing through the point A and an actual position C1 of the positioning photosphere is parallel to a Y-axis of a dual-camera coordinate system and the point A is separated from the C1 by a length Y1, make an intersection point N of the C1A and the plane XY of the world coordinate system, wherein the actual position C1 of the positioning photosphere is the offset coordinate (X1, Y1, Z1) in the world coordinate system relative to the target position S;

make an intersection point P of the Y axis in the dual-camera coordinate system and the plane XY of the world coordinate system;

make a perpendicular of the plane XY of the world coordinate system through the position C of the dual camera to have an intersection point H with the plane XY of the world coordinate system;

make an intersection point T by intersecting a line that passes through the S and is parallel to a line NB with a line C1N, wherein a line ST intersects with a preset plane at an intersection point E, and the preset plane is a plane that passes through a line CH and is parallel to a plane YZ of the world coordinate system; and make the projection G of the S on the preset plane, making the perpendicular of the CH to pass through the C1, and to intersect with the CH at J, make the plane XY of the world coordinate system through the S to intersect with the line CH at C2, make the perpendicular of the line SE to pass through the C2 and to intersect with the line SE at F.

6. The electronic device in accordance with claim 5, wherein to establish a mathematical equation set in accordance with the geometric positional relationship, the instructions cause the at least one processor to:

formulate a first equation set in accordance with the geometric figure projection of the geometric positional relationship in the positive direction of the Z-axis of the dual-camera coordinate system:

$$QB = Y0 * \sin \gamma + X1;$$

$$NA = (Y0 * \sin \gamma + X1) * \tan \gamma + Y0 * \cos \gamma,$$

wherein Y0 is a reference coordinate value of the positioning photosphere, and an angle γ is a rotation angle of the dual-camera coordinate system around the Z-axis relative to the world coordinate system;

formulate a second equation set in accordance with the geometric figure projection of the geometric positional relationship in the negative direction of the X-axis of the dual-camera coordinate system:

$$NC1 = (Y0 * \cos \gamma + (X1 + Y0 * \sin \gamma) * \tan \gamma) / \cos \alpha + Y;$$

$$CP = Z1 * \tan \alpha + (Y0 * \cos \gamma + (X1 + Y0 * \sin \gamma) * \tan \gamma) / \cos \alpha + Y1;$$

wherein the α is a rotation angle of the dual-camera coordinate system around the X-axis relative to the world coordinate system;

formulate a third equation set in accordance with the geometric figure projection of the geometric positional relationship in the negative direction of the Z-axis of the world coordinate system:

$$CH = (Z1 * \tan \alpha + (Y0 * \cos \gamma + (X1 + Y0 * \sin \gamma) * \tan \gamma) / \cos \alpha + Y1) * \cos \gamma;$$

solve a coordinate value CH of the dual camera on the Y-axis of the world coordinate system in accordance with the first equation set, the second equation set and the third equation set, when solving the mathematical equation set to acquire coordinate values of the dual camera on each coordinate axis of the world coordinate system;

formulate a fourth equation set in accordance with the geometric figure projection of the geometric positional relationship in the positive direction of the Z-axis of the dual-camera coordinate system:

$$AT = X1 * \tan \gamma;$$

$$TF = (Y1 + X1 * \tan \gamma) * \sin \gamma;$$

$$SF = X1 / \cos \gamma - (Y1 + X1 * \tan \gamma) * \sin \gamma;$$

formulate a fifth equation set in accordance with the geometric figure projection of the geometric positional relationship in the negative direction of the X-axis of the world coordinate system:

$$C2F = Z1 * \cos \alpha;$$

formulate a sixth equation set in accordance with the geometric figure projection of the geometric positional relationship in the positive direction of the Y-axis of the dual-camera coordinate system:

$$FE = Z1 * \cos \alpha * \tan \beta;$$

$$KF = (X1 / \cos \gamma - (Y1 + X1 * \tan \gamma) * \sin \gamma) * \tan \beta;$$

$$SE = X1 / \cos \gamma - (Y1 + X * \tan \gamma) * \sin \gamma + Z1 * \cos \alpha * \tan \beta;$$

$$SG = (X1 / \cos \gamma - (Y1 + X1 * \tan \gamma) * \sin \gamma + Z1 * \cos \alpha * \tan \beta) * \cos \beta;$$

$$C2K = Z1 * \cos \alpha - (X1 / \cos \gamma - (Y1 + X1 * \tan \gamma) * \sin \gamma) * \tan \beta;$$

$$C2G = (Z1 * \cos \alpha - (X1 / \cos \gamma - (Y1 + X1 * \tan \gamma) * \sin \gamma) * \tan \beta) * \cos \beta;$$ and solve the coordinate value SG of the dual camera in the X-axis and the coordinate value C2G of the dual camera in the Z-axis of the world coordinate system in accordance with the fourth equation set, the fifth equation set and the sixth equation set, when solving the mathematical equation set to acquire coordinate values of the dual camera on each coordinate axis of the world coordinate system.

7. A non-transitory computer-readable storage medium having machine-readable instructions that, when executed by at least one processor, cause the at least one processor to:
acquire an offset angle of a dual-camera coordinate system relative to a world coordinate system, wherein the world coordinate system is a coordinate system that is preset by using a known target position of a positioning photosphere as a reference coordinate;
acquire an actual position of the positioning photosphere in the world coordinate system;
calculate a coordinate value of the dual camera in the world coordinate system in accordance with the offset angle, the actual position of the positioning photosphere and the target position; and
determine a position of a virtual object in a virtual space in the world coordinate system in accordance with the coordinate value of the dual camera in the world coordinate system;
wherein to calculate a coordinate value of the dual camera in the world coordinate system in accordance with the offset angle, the actual position of the positioning photosphere and the target position, the instructions cause the at least one processor to:
establish a geometric positional relationship in accordance with the offset angle, the actual position of the positioning photosphere and the target position;
establish a mathematical equation set in accordance with the geometric positional relationship, wherein a coordinate value of the dual camera on each coordinate axis of the world coordinate system is an unknown variable of the mathematical equation set; and
solve the mathematical equation set to acquire the coordinate value of the dual camera on each coordinate axis of the world coordinate system.

8. The non-transitory computer-readable storage medium in accordance with claim 7, wherein to establish the geometric positional relationship in accordance with the offset angle, the actual position of the positioning photosphere and the target position, the instructions cause the at least one processor to:
make a projection point B of a target position S on a plane XY of the world coordinate system, make a point A, wherein a line passing through the point A and an actual position C1 of the positioning photosphere is parallel to a Y-axis of a dual-camera coordinate system and the point A is separated from the C1 by a length Y1, make an intersection point N of the C1A and the plane XY of the world coordinate system, wherein the actual position C1 of the positioning photosphere is the offset coordinate (X1, Y1, Z1) in the world coordinate system relative to the target position S;
make an intersection point P of the Y axis in the dual-camera coordinate system and the plane XY of the world coordinate system;
make a perpendicular of the plane XY of the world coordinate system through the position C of the dual camera to have an intersection point H with the plane XY of the world coordinate system;

make an intersection point T by intersecting a line that passes through the S and is parallel to a line NB with a line C1N, wherein a line ST intersects with a preset plane at an intersection point E, and the preset plane is a plane that passes through a line CH and is parallel to a plane YZ of the world coordinate system; and make the projection G of the S on the preset plane, making the perpendicular of the CH to pass through the C1, and to intersect with the CH at J, make the plane XY of the world coordinate system through the S to intersect with the line CH at C2, make the perpendicular of the line SE to pass through the C2 and to intersect with the line SE at F.

9. The non-transitory computer-readable storage medium in accordance with claim 8, wherein to establish a mathematical equation set in accordance with the geometric positional relationship, the instructions cause the at least one processor to:

formulate a first equation set in accordance with the geometric figure projection of the geometric positional relationship in the positive direction of the Z-axis of the dual-camera coordinate system:

$$QB = Y0 * \sin \gamma + X1;$$

$$NA = (Y0 * \sin \gamma + X1) * \tan \gamma + Y0 * \cos \gamma,$$

wherein Y0 is a reference coordinate value of the positioning photosphere, and an angle $\gamma$ is a rotation angle of the dual-camera coordinate system around the Z-axis relative to the world coordinate system;

formulate a second equation set in accordance with the geometric figure projection of the geometric positional relationship in the negative direction of the X-axis of the dual-camera coordinate system:

$$N\ C1 = (Y0 * \cos \gamma + (X1 + Y0 * \sin \gamma) * \tan \gamma) / \cos \alpha + Y1;$$

$$CP = Z1 * \tan \alpha + (Y0 * \cos \gamma + (X1 + Y0 * \sin \gamma) * \tan \gamma) / \cos \alpha + Y1;$$

wherein the $\alpha$ is a rotation angle of the dual-camera coordinate system around the X-axis relative to the world coordinate system;

formulate a third equation set in accordance with the geometric figure projection of the geometric positional relationship in the negative direction of the Z-axis of the world coordinate system:

$$CH = (Z1 * \tan \alpha + (Y0 * \cos \gamma + (X1 + Y0 * \sin \gamma) * \tan \gamma) / \cos \alpha + Y) * \cos \gamma;$$

solve a coordinate value CH of the dual camera on the Y-axis of the world coordinate system in accordance with the first equation set, the second equation set and the third equation set, when solving the mathematical equation set to acquire coordinate values of the dual camera on each coordinate axis of the world coordinate system;

formulate a fourth equation set in accordance with the geometric figure projection of the geometric positional relationship in the positive direction of the Z-axis of the dual-camera coordinate system:

$$AT = X1 * \tan \gamma;$$

$$TF = (Y1 + X1 * \tan \gamma) * \sin \gamma;$$

$$SF = X1 / \cos \gamma - (Y1 + X1 * \tan \gamma) * \sin \gamma;$$

formulate a fifth equation set in accordance with the geometric figure projection of the geometric positional relationship in the negative direction of the X-axis of the world coordinate system:

$$C2F = Z1 * \cos \alpha;$$

formulate a sixth equation set in accordance with the geometric figure projection of the geometric positional relationship in the positive direction of the Y-axis of the dual-camera coordinate system:

$$FE = Z1 * \cos \alpha * \tan \beta;$$

$$KF = (X1 / \cos \gamma - (Y1 + X1 * \tan \gamma) * \sin \gamma) * \tan \beta;$$

$$SE = X1 / \cos \gamma - (Y1 + X1 * \tan \gamma) * \sin \gamma + Z1 * \cos \alpha * \tan \beta;$$

$$SG = (X1 / \cos \gamma - (Y1 + X1 * \tan \gamma) * \sin \gamma + Z1 * \cos \alpha * \tan \beta) * \cos \beta;$$

$$C2K = Z1 * \cos \alpha - (X1 / \cos \gamma - (Y1 + X1 * \tan \gamma) * \sin \gamma) * \tan \beta;$$

$$C2G = (Z1 * \cos \alpha - (X1 / \cos \gamma - (Y + X1 * \tan \gamma) * \sin \gamma) * \tan \alpha) * \cos \beta;\ \text{and}$$

solve the coordinate value SG of the dual camera in the X-axis and the coordinate value C2G of the dual camera in the Z-axis of the world coordinate system in accordance with the fourth equation set, the fifth equation set and the sixth equation set, when solving the mathematical equation set to acquire coordinate values of the dual camera on each coordinate axis of the world coordinate system.

* * * * *